United States Patent
Ritz et al.

(10) Patent No.: US 6,298,010 B1
(45) Date of Patent: Oct. 2, 2001

(54) ORIENTATION AID FOR THE BLIND AND THE VISUALLY DISABLED

(76) Inventors: Maria Ritz, Muskauer Strasse 36, D-10997 Berlin (DE); Lutz König, Zabel-Krüger-Damm 165, D-13469 (DE); Ludger Wöste, Waltariestrasse 17, D-14109 Berlin (DE)

( * ) Notice: Subject to any disclaimer, the term of this patent is extended or adjusted under 35 U.S.C. 154(b) by 0 days.

(21) Appl. No.: 09/423,060
(22) PCT Filed: Apr. 30, 1998
(86) PCT No.: PCT/DE98/01249
  § 371 Date: Oct. 29, 1999
  § 102(e) Date: Oct. 29, 1999
(87) PCT Pub. No.: WO98/48749
  PCT Pub. Date: Nov. 5, 1998

(30) Foreign Application Priority Data

Apr. 30, 1997 (DE) .......................... 297 08 128 U
Jan. 9, 1998 (DE) .......................... 298 00 598 U

(51) Int. Cl.⁷ .................................. G01S 15/88
(52) U.S. Cl. ............................................. 367/116
(58) Field of Search ............................ 367/116; 342/24; 356/3.14

(56) References Cited

U.S. PATENT DOCUMENTS

| | | |
|---|---|---|
| 3,546,467 | 12/1970 | Benjamin, Jr. et al. . |
| 3,654,477 | 4/1972 | Benjamin, Jr. . |
| 4,071,297 | 1/1978 | Leitz et al. . |
| 4,310,903 * | 1/1982 | Kay ..................... 367/116 |
| 4,712,003 | 12/1987 | Ban et al. . |
| 5,487,669 | 1/1996 | Kelk . |
| 5,687,136 | 11/1997 | Borenstein . |

FOREIGN PATENT DOCUMENTS

| | | |
|---|---|---|
| 23 30 940 | 1/1975 | (DE) . |
| 25 11 935 | 9/1976 | (DE) . |
| 28 16 530 | 10/1979 | (DE) . |
| 29 32 659 | 2/1981 | (DE) . |
| 31 33 645 | 3/1983 | (DE) . |
| 35 44 047 | 6/1987 | (DE) . |
| 37 43 696 | 6/1989 | (DE) . |
| 38 36 961 | 5/1990 | (DE) . |
| 39 07 907 | 9/1990 | (DE) . |
| 40 04 438 | 8/1991 | (DE) . |
| 41 40 976 | 7/1992 | (DE) . |
| 44 02 764 | 7/1995 | (DE) . |
| 195 05 402 | 8/1996 | (DE) . |
| 195 22 601 | 1/1997 | (DE) . |
| WO 9521595 * | 8/1995 | (EP) . |
| PCT/FI97/ 00491 | 8/1997 | (WO) . |

* cited by examiner

*Primary Examiner*—Daniel T. Pihulic
(74) *Attorney, Agent, or Firm*—Mallinckrodt & Mallinchrodt; Robert R. Mallinckrodt

(57) ABSTRACT

The invention relates to device serving as an orientation aid for blind and visually disabled, comprising at least one contactless distance measurement system (1,2) which provides correcting variables depending on the distance between the device and an object detected by the distance measurement system (1,2). At least one indicating device is also provided, which is impinged upon by the correcting variable of the distance measurement system (1,2) and which supplies an indication depending on the correcting variable. The indicating device comprises at least one tactile indicator (3) which is continuously or quasi-continuously displaced along a tactile path as monotone function of the distance measured by the distance measurement system (1,2). The tactile indicator can, for instance, comprise an adjustable element (3). The user can thus feel the distance measured by touching the position of the displaceable element (3).

27 Claims, 3 Drawing Sheets

ORIENTATION AID FOR THE BLIND AND THE VISUALLY DISABLED

TECHNICAL FIELD

The invention relates to a device to aid the orientation of blind and partially sighted people, comprising
(a) at least one contactless distance measurement system, which generates a correcting variable depending on the distance between the device and an object measured by the distance measurement system, and
(b) at least one indicating device, to which the correcting variable of the distance measurement system is applied and which supplies an indication depending on the correcting variable.

BACKGROUND ART

Blind or partially sighted people usually use a mobility or long cane for orientation, with which objects in a distance up to 1.2 m can be detected. The orientation with such a long cane has several disadvantages. Especially the distance to the detectable objects is very short.

A number of devices for blind or partially sighted people is known which use contactless distance measurement systems to rectify the disadvantages of the long cane. Different versions of such a contactless distance measurement system are known. These devices comprise a transmitter which sends out a measurement beam and if the beam is reflected by an object a receiver detects the reflected beam. The distance between the device and the object is determined either via a time of flight measurement or by triangulation. The measurement beam can be electromagnetic (IR-radiation or laser beam) or sonic. The determined distance will be converted into a distance-dependent correcting variable which will be supplied to an indicator that displays the distance in a way that is adapted to the needs of the blind and partially sighted persons. Such indicators use either acoustic or vibronic signals.

The DE-A1-37 43 696 reveals a mobility aid that use a contactless distance measurement system. A transmitter sends out an IR-beam or a laser beam. If the beam is reflected by an obstacle a receiver detects the reflected beam and an acoustic signal will be generated. Transmitter and receiver are put in a device that is carried in front of the blind persons body. The measured distance to the obstacle is indicated by the pitch and the volume of the acoustic signal.

The DE-A1-35 44 047 describes a mobility aid that works with a contactless distance measurement system which measure the distance to an obstacle by a so called sonic echo pulse time of flight method. A miniaturized sonic echo pulse time of flight evaluation device is put on the long cane. The pulses which are reflected by an obstacle are detected by a receiver and analyzed. The measured distance is converted into an acoustic noticeable audio frequency. This results in a kind of musical sequence of sounds if the distance to the obstacle decreases.

By the DE-A1-44 02 764 an other mobility aid using a contactless distance measurement system is known. In one housing comprises a radar signal transmitter, a radar receiver and a unit to analyze which produces a control signal if there is a frequency difference between the send and the received signals reflected by the surrounding. The control signal is supplied to a signal generator who is built as a kind of tappet pestle that is moving electromagnetic. The mechanic effect occurs on the body of the person through the force of pressure depending on the control signal. The radar system and the tappet pestle are arranged in a headgear. Within a further development of the mobility aid a second radar system and a second tappet is provided. The second radar system is arranged in a belt.

By the DE-A1-25 11 935 a further mobility aid for partially sighted persons using a contactless distance measurement system is known. Here the measured distance (or any measured value) is indicated acoustically by variation of the pitch and volume or vibronic through the variation of the vibrational frequency, the force of vibration and the kind of vibration.

Through the DE-A1-195 22 601 a further mobility aid for partially sighted persons using a contactless distance measurement system is known. A primary unit of the device comprises a sonic transmitter and a sonic receiver. A second unit comprises a micro computer for the receiver signals and a electro-mechanic vibrator as indicator.

Further devices using contactless distance measurement as orientation aid for blind and partially sighted people which use similar acoustic or vibronic indications are described in DE-A1-41 40 976, DE-A1-29 32 659, DE-PS-23 30 940, DE-A1-28 16 530, DE-A1-31 33 645, DE-A1-195 05 402, DE-A1-40 438 and DE-A1-38 36 961.

It turned out that the display of the indication devices of the known mobility aids for blind people working with contactless distance measurements is not satisfying. The main reason therefore is the difficulty of interpretation of those acoustic or vibronic signals. The assignment of a acoustic or vibronic signal to a determined distance needs a lot of practice. While the user receives the actually measured signal there is no reference signal (e.g. distance zero) to compare with. Furthermore, acoustic signals bother blind persons because they use their hearing for orientation in and perception of the environment.

DISCLOSURE OF INVENTION

The object of the invention is to indicate a measured distance—in a device for orientation of blind or partially sighted people as described above—in a way that is easy and clear noticeable for the blind and partially sighted person.

According to the invention this object is achieved in that
(c) the indicating device comprises at least one tactile indicator, which is displaced continuously or quasi continuously along a tactile path as monotone function of the distance measured by the distance measurement system.

Thus the indication device delivers tactile indicator which represents the determined distance not through different tones or vibrations but through a displacement. In this way a "direct" indication of the distance occurs. The measured distance, namely the distance to an object will be transformed into a tactile distance, namely the displacement of the tactile indicator. This makes the interpretation of the indication device much easier.

The user feels the tactile path along which the tactile indicator is moving. The tactile path may be designed in such a manner that the user can feel the tactile path with one part of his body without displacing this part of his body. For example the tactile path can be covered by a part of the forearm or by a finger (e.g. the thumb). The tactile indicator is moving in relation to this part of the body. Thus the user feels the position of the tactile indicator and relates a distance to this position.

The displacement of the tactile indicator occurs in relation to the measured distance as monotone function, this means a small distance is shown as a small displacement and a longer distance is shown as a larger displacement. This also makes the interpretation much easier.

The displacement of the tactile indicator occurs continuously or quasi continuously. A quasi continuous displacement means that the displacement is stepwise.

As contactless distance measurement system which generates a correcting variable which is depending on the measured distance between the device and an object detected by the measurement system can be any kind of distance measurement system. The presented invention is not restricted to a specific design of the distance measurement system. Acoustical as well as optical systems can be used. Such distance measurement systems are known and will not be described in more detail here.

However, a laser distance measurement system is preferably used. The use of a laser beam to detect a distance has two substantial advantages. Based on the small divergence of the beam even fine structures e.g. ropes can be scanned by pointing the device in that direction.

Therefore the device has to be moved slightly to and fro. Furthermore the range is very high.

Thus through the device according to the invention the blind has the opportunity to orientate in an environment by the directional information namely by pointing in a direction with the device and the distance information without additional strain to his hearing.

The tactile indicator may have different designs. In one design the indicating device may have an element to feel which moves along a tactile path. The representation of the measured distance results in this case by a displacement or movement of an adjustable element. The moving element may be a slide which is displaced e.g. by a servomotor. The moving element may also be a swiveling lever which swivels depending on the measured distance. Thus the free end of the lever moves along the tactile path.

In an other design of the indication device the tactile indicator may by built with adjustable elements which are located along the tactile path and are displaced perpendicular to the tactile path. There a determined distance is assigned to each element. Thus the control and displacement of a determined element represents a determined distance. In this case the elements are not displaced along the tactile path but perpendicular to the tactile path. The elements may e.g. be displaced piezoelectric or may be piezoelectric elements.

There might be vibrating means adapted to vibrate the moveable elements which are located along the tactile path or which are moveable perpendicular to the tactile path. Vibrating means may also be adapted to vibrate other, additional elements like e.g. a vibrating pad for the flat of the hand. This vibration of the indicating device may indicate further characteristics like the roughness or the reflection coefficient of the surface of the detected object.

The indication device may comprise elements located along the tactile path adapted to generate electrical or thermal pulses. These pulses will be felt by the user.

Preferably a tactile reference point is designed which is used as a reference for the indication device. Then the tactile indicator always is located in a distance to the reference point which is depending on the measured distance. Thus the interpretation of the indicator is made easier.

The monotone function according to which the displacement of the tactile indicator along the tactile path is based on, i.e. the transfer function between the measured distance and the displacement of the tactile indicator can be of any kind. In the simplest case it is a linear function, i.e. the displacement of the tactile indicator is proportional to the measured distance. Such a proportional displacement is especially advantageous for small distances up to a few meters. If larger distance ranges are detected a proportional displacement would cause a very small change of the tactile indicator for small distances. Therefore a logarithmic displacement of the tactile indicator along the tactile path depending on the distance measured by the distance measurement system is preferred. In that way a change in distance in the closer area causes a larger displacement of the tactile indicator than changes of distance in areas far away. Literally any other monotone function can be used, e.g. a square function.

Means may be provided to change the monotone function. By that the function can be adjusted for the individually needs of the user (either by fabrication or by the user himself) or the user may choose the function that fits most to his momentary situation.

The device according to the invention may provide means to switch the range of the indicator which allow to change the range of the indicator of the indication device. By this way also a change of the transfer function between the measured distance and the displacement of the tactile indicator results. Thus, by this indication switching means it is possible to assign the full range of the tactile indicator to different indicator ranges. E.g. in a first switch position of the switching means the indication range 0–1 m can be represented by the tactile indicator, in a second switch position the indication range 0–3 m, in a third switch position the indication range 0–10 m and in a fourth switch position the indication range 0–30 m.

The indication range switching means can comprise one or more actuating elements to change the indication range. For example this actuating elements can be switches or keys. Then the appropriate indication range is adjusted by pushing one of the keys.

Preferably the tactile indicator is designed in a housing adapted to be put on a part of the users body. Therefore it is favourable if the housing is put on a well defined, reproducible position on the part of the body so that the tactile indicator always is in touch with the same point of the body. This can be achieved by putting on and fastening the housing on the forearm of the user. The form of the housing is then preferably fitted to the shape of the forearm. However, the housing may also be designed as hand held device where the tactile path is located at the outside of the housing and can be detected by a finger of the user. The direction in which the obstacles will be measured can be adjusted by moving the device. The design of the housing is then preferably in a way that the user can find the orientation and location of the housing by his feel of touch. This may be reached through certain protrusions or recesses.

For the design as a hand held device it turned out to be advantageous if the tactile path is in a area of the housing which can be detected by the thumb. Eventually existing indicator range switching means may be mounted in a way that they can be activated by the other fingers.

Preferably the tactile path extends in an recess of the housing. This recess for example can be a hollow fitted to the shape of the thumb. The indicator range switching means may be designed in one or more recesses of the housing. Therefore the form of recesses may be fitted to the shape of the fingers.

The different functional units of the device, i.e. the distance measurement system, the indicator and the affiliated electronics and the power supply can be put into different housings. But in one embodiment of the device according to the invention the entire device is provided in one single housing. Thus the device becomes very handy.

The device can also comprise two or more contactless distance measurement systems each adapted to generate a correcting variable depending on each distance between the device and each obstacle detected by each of the distance measured systems. These contactless distance measurement systems can be of the same kind as well as of different kinds. They can point in the same direction thereby achieving improvement of the signal. But they also can cover different areas such that several different measurement values are obtained. Then also several indication devices can be provided. These indicating devices can be of different kind as well. Also a combination of known indication devices with the indication device according to the invention is possible. Preferably an independent indication device is assigned to each distance measurement system. These indication devices can be tactile indicators as described above. Therefore the tactile paths along which the independent tactile indicators are moving can extend side by side thus the tactile indicators could be detected simultaneous with one part of the body. The independent tactile indicators can extend parallel or also with a angle to each other. In this way it is especially possible to feel contours of objects, for example kerbs, without swivel the device.

The device according to the invention preferably runs by batteries. Therefore means to generate a warning signal indicating decreasing battery voltage could be designed. This warning signal can be either an acoustical or a tactile signal. By this the user will early be informed about an eventual failure of the device.

The device according to the invention can be equipped with a telescopically extendable cane placed in the housing were the one or more distance measurement systems are located. If the device fails the user can pull out this cane and use it as a conventional mobility cane.

Embodiments of the invention will now be described in greater detail with reference to the accompanying drawings.

PREFERRED EMBODIMENTS OF THE INVENTION

Figure 1:
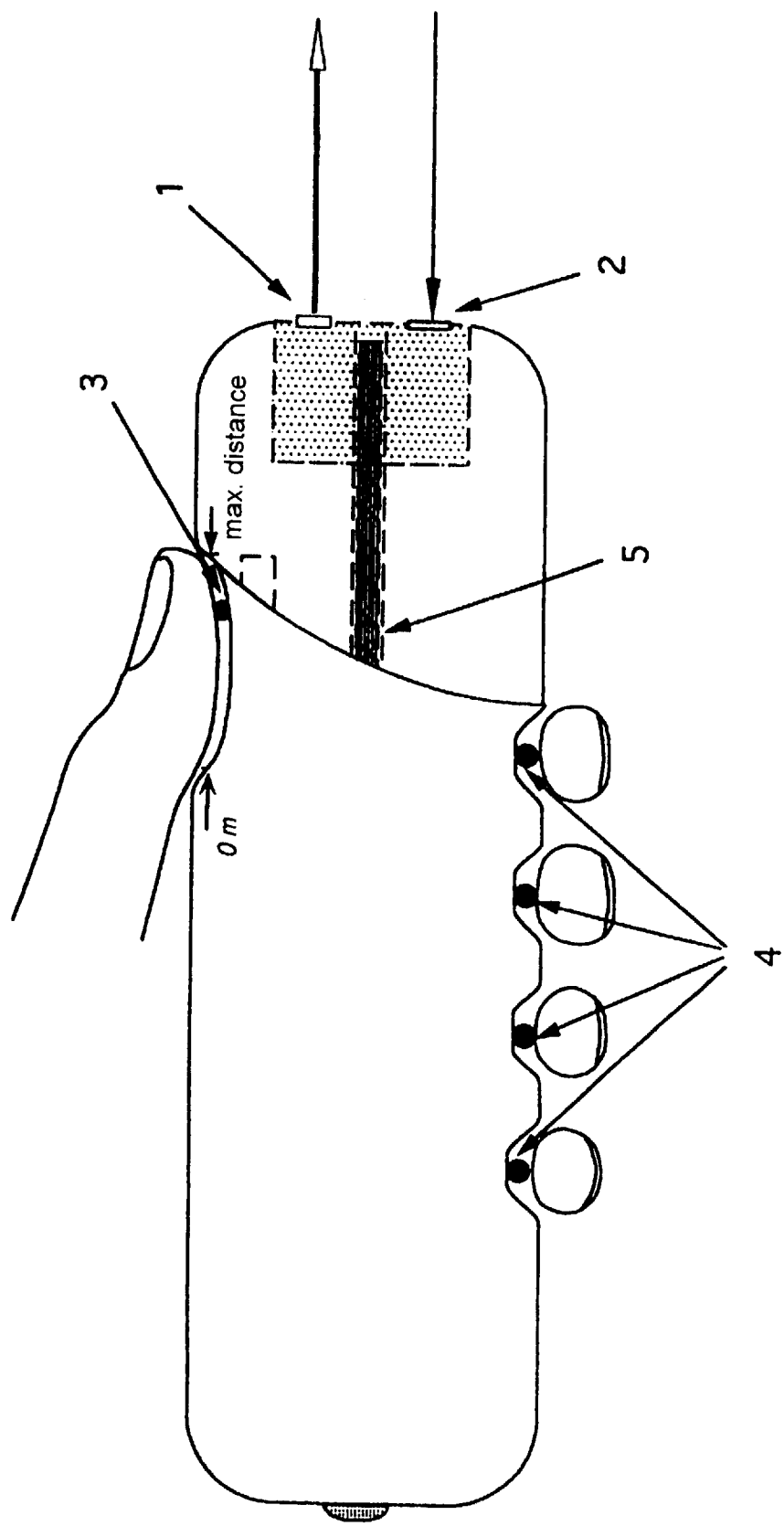
FIG. 1 is a schematic side view, partially drawn in section, and shows an embodiment of a device to aid orientation of blind and partially sighted people which is designed as a hand held device.

The embodiment shown in FIG. 1 is a hand held device which is equipped with one single contactless distance measurement system. In this case the distance measurement system is a laser system which measures the distance by means of flight measurement. The transmitter and the receiver unit of the laser distance measurement system are located in the front part of the device. Preferably a diode laser 1 is used which transmits low power (to guarantee safety for other persons) in the IR range and a suitable photo diode 2 which receives the reflected beam. The time of flight of the laser beam is evaluated in a known manner and via the electronic circuit an electrical correcting variable according to the determined distance is generated. In this embodiment the voltage supply is effected by a battery integrated in the device. Such laser distance measurement systems are known and therefore not described in detail here.

The generated correcting variable is supplied to an indicating device. The indicating device contains a servomotor which is moving the tactile indicator. In this embodiment the tactile indicator comprises a slide in the form of a small pin 3 which is assigned on the upper side of the device. Thus the distance determined by the time of flight measurement of the transmitted and the scattered beam is displayed by the pin 3. This pin moves along the tactile path over a distance of about 3 cm and can be felt with the thumb. Therefore the pin 3 can move for example linearly depending on the determined distance. The pin moves in continuously or quasi continuously in small steps.

In the embodiment illustrated in FIG. 1 indication range switching means are provided to change the indication range of the indication device. The indication range is changed by actuating elements in form of four keys 4 on the lower side of the device. e.g. the range of 0–1 m is chosen by pressing the first key. This means that the real indication range of 3 cm corresponds to a measured distance of 1 m. If the beam is not reflected in this distance the pin 3 is located at the front stop. Now the next range, e.g. 0–3 m, is selected. If the beam now is reflected after 1.5 m the position of the pin 3 is in the middle of the indicating range.

In a further possible embodiment the distance is represented by a logarithmic scale. In this case the resolution of the area close by is automatically clearly higher than in a further distance. Thus less indication ranges are necessary or they are completely superfluous.

In a further embodiment the device comprises means to change the functional form of the scale. Then for example the user can switch between the linear and the logarithmic representation. This means may also comprise keys which are designed similar to the keys of the indication range switching means.

To make the habituation to the device easier and for safety reasons, e.g. if the battery voltage breaks down, a telescopic cane 5 which can be used as a conventional mobility cane is integrated into the device as shown in the embodiment in FIG. 1.

As obvious from FIG. 1, the tactile path and with it the pin 3 extends along a recess in form of a hollow which is adapted to the shape of the thumb. The four keys 4 also are located in hollows which are fitted to the shape of the fingers. (In FIG. 1 the thumb is indicated on the top and the tip of the remaining fingers of a hand of a user are indicated underneath.) Through this design the finding of the pin 3 and the keys 4 becomes easier. Further the position and the alignment of the device can be felt through that design.

In a further embodiment (not illustrated in the Figures) a swiveling lever as part of the tactile indicator is provided instead of the moving pin 3.

Figure 2:
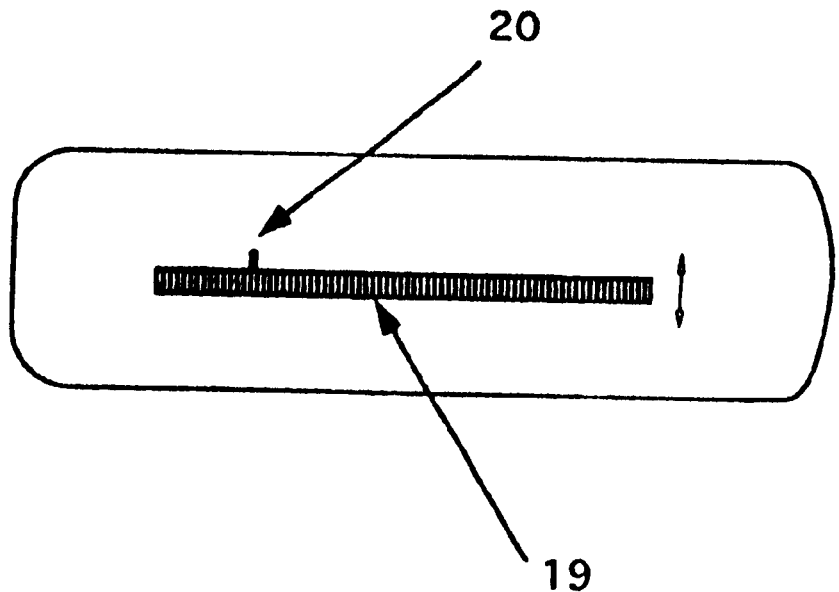
FIG. 2 is a schematic illustration and shows an embodiment of the tactile indicator of a device to aid orientation of blind and partially sighted people.

In FIG. 2 a further embodiment of the tactile indicator is shown schematically in top view. All the further parts of FIG. 1 are left out in FIG. 2. Instead of the moving pin 3 (FIG. 1) a row 19 of elements displaceable perpendicularly to the tactile path is provided as part of the tactile indicator. The direction of the displacement is indicated in FIG. 2 as double arrow. The elements of the row 19 might be displaced piezoelectrically or otherwise. In FIG. 2 one of the elements 20 is displaced. The user feels this displacement as an indicator of the measured distance.

Figure 3:
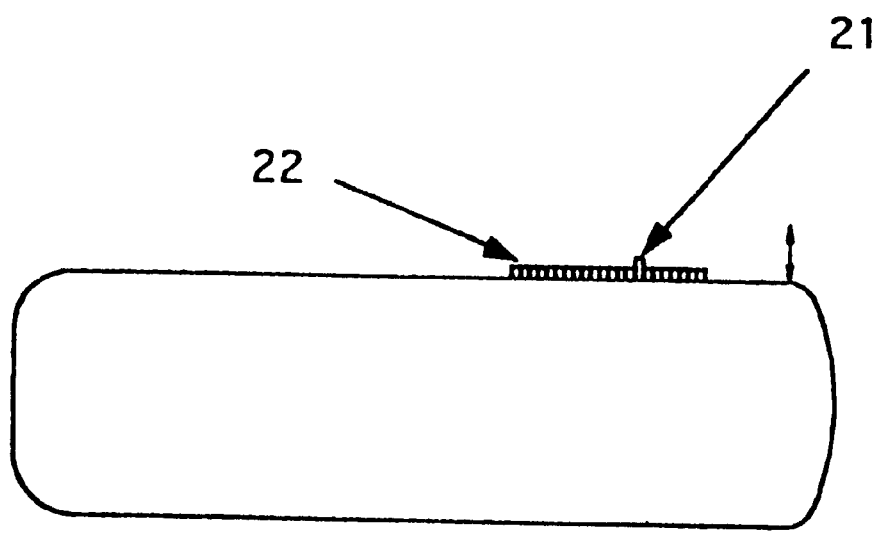
FIG. 3 is a schematic illustration and shows a further embodiment of the tactile indicator of a device to aid orientation of blind and partially sighted people.

In FIG. 3 another embodiment of the tactile indicator is shown schematically in a side view. All the further parts of FIG. 1 are left out in FIG. 3. Instead of the moving pin 3 (FIG. 1) a row 22 of elements displaceable perpendicularly to the tactile path is assigned. In FIG. 3 the direction of the displacement is indicated by a double arrow. The elements can be displaced piezoelectrically or otherwise. In FIG. 3 one of the elements of the row 22 is displaced. The user feels this displacement as an indicator of the measured distance.

Figure 4:
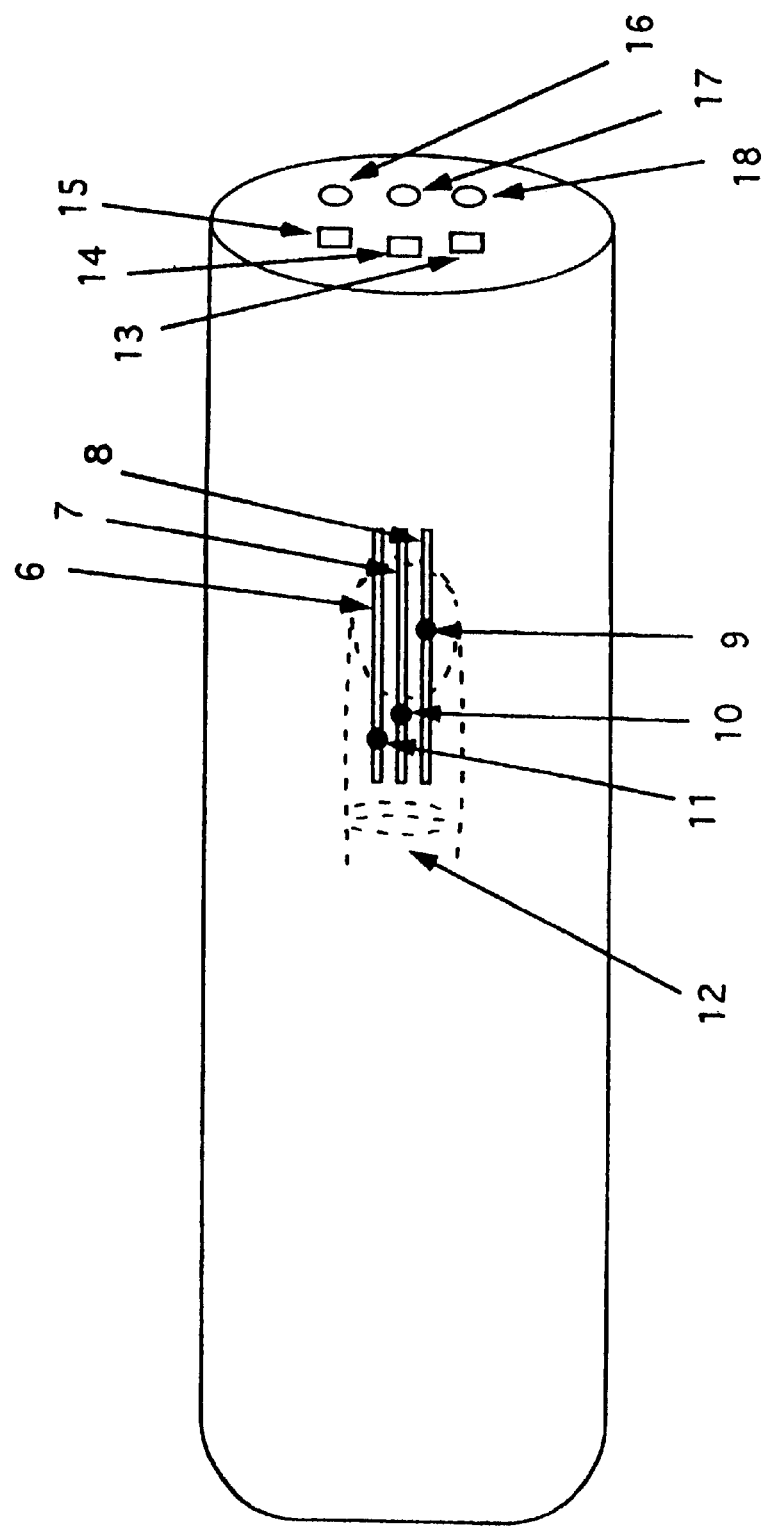
FIG. 4 is a schematic side view and shows a further embodiment of the tactile indicator of a device to aid orientation of blind and partially sighted people which is designed as hand held device.

In FIG. 4 a further embodiment of the device to aid orientation of blind and partially sighted people is shown. The device shown in FIG. 4 may be designed similar to the device shown in FIG. 1. Instead of just one contactless measurement system and just one tactile indicator three contactless measurement systems and three tactile indicators are integrated into one single device. Instead of just one laser diode 1 and just one photodiode 2 (FIG. 1) three laser diodes 13, 14 and 15 and three photodiodes 16, 17 and 18 are assigned. The three laser diodes 13, 14 and 15 are pointing in different directions such that not only one point but three points will be traced. The three distance measurement systems generate three correcting variables which will be supplied to the three indicating devices. The indicating devices are constructed similar to the indicating device shown in FIG. 1. A tactile path 6, 7 and 8 and a movable pin 9, 10 and 11 moving along the tactile path 6, 7 and 8 belongs to each tactile indicator. The three tactile paths 6, 7 and 8 are located close to each other and are extending parallel to each other. Thus all three tactile paths can be covered simultaneously with one part of the body, in this case by the thumb 12.

In a further embodiment the indication of the distance occurs on another part of the body e.g. along the forearm either mechanically like shown in the embodiment or by electrical or thermal stimulation.

What is claimed is:

1. A device to aid the orientation of blind and partially sighted people, comprising
    at least one contactless distance measurement system, which generates a correcting variable depending on the distance between the device and an object measured by the distance measurement system, and
    at least one indicating device, to which said correcting variable of said distance measurement system is applied and which supplies an indication depending on said correcting variable,
    wherein
        said indicating device comprises at least one tactile element displaceable continuously or quasi continuously along a tactile path as a monotone function of the distance measured by said distance measurement system.

2. The device of claim 1, wherein the indicating device comprises a servomotor, to which said correcting variable of said distance measurement system is applied and which is arranged to displace said tactile element.

3. The device of claim 1, wherein said tactile element is a slide.

4. The device of claim 1, wherein said tactile element is a swiveling lever.

5. The device of claim 1, further comprising vibrating means adapted to vibrate said tactile element displaceable along said tactile path.

6. A device to aid the orientation of blind and partially sighted people, comprising
    at least one contactless distance measurement system, which generates a correcting variable depending on the distance between the device and an object measured by the distance measurement system, and
    at least one indicating device, to which said correcting variable of said distance measurement system is applied and which supplies an indication depending on said correcting variable,
    wherein
        said indicating device comprises a row of elements placed along a tactile path and displaceable perpendicularly to said tactile path as a monotone function of the distance measured by said distance measurement system.

7. The device of claim 6, wherein said displaceable elements are displaceable piezoelectrically.

8. The device of claim 6, further comprising vibrating means adapted to vibrate said elements placed along said tactile path and displaceable perpendicularly to said tactile path.

9. A device to aid the orientation of blind and partially sighted people, comprising
    at least one contactless distance measurement system, which generates a correcting variable depending on the distance between the device and an object measured by the distance measurement system,
    at least one indicating device, to which said correcting variable of said distance measurement system is applied and which supplies as indication depending on said correcting variable,
    wherein
        said indicating device comprises at least one tactile indicator, which is displaced continuously or quasi continuously along a tactile path as a monotone function of the distance measured by said distance measurement system; and
        a tactile reference point which serves as a reference for said indicator.

10. A device to aid the orientation of blind and partially sighted people, comprising
    at least one contactless distance measurement system, which generates a correcting variable depending on the distance between the device and an object measured by the distance measurement system,
    at least one indicating device, to which said correcting variable of said distance measurement system is applied and which supplies an indication depending on said correcting variable,
    wherein
        said indicating device comprises at least one tactile indicator, which is displaced continuously or quasi continuously along a tactile path as monotone function of the distance measured by said distance measurement system; and
        means to change said monotone function.

11. A device to aid the orientation of blind and partially sighted people, comprising
    at least one contactless distance measurement system, which generates a correcting variable depending on the distance between the device and an object measured by the distance measurement system, and
    at least one indicating device, to which said correcting variable of said distance measurement system is applied and which supplies an indication depending on said correcting variable,
    wherein
        said indicating device comprises at least one tactile indicator, which is displaced continuously or quasi continuously along a tactile path as a monotone function of the distance measured by said distance measurement system, and wherein said tactile indicator is displaced along said tactile path proportionally to said distance measured by said distance measurement system.

12. A device to aid the orientation of blind and partially sighted people, comprising
at least one contactless distance measurement system, which generates a correcting variable depending on the distance between the device and an object measured by the distance measurement system, and
at least one indicating device, to which said correcting variable of said distance measurement system is applied and which supplies an indication depending on said correcting variable,
wherein
said indicating device comprises at least one tactile indicator, which is displaced continuously or quasi continuously along a tactile path as a monotone function of the distance measured by said distance measurement system, and wherein said tactile indicator is displaced along said tactile path in a logarithmic dependence of said distance measured by said distance measurement system.

13. A device to aid the orientation of blind and partially sighted people, comprising
at least one contactless distance measurement system, which generates a correcting variable depending on the distance between the device and an object measured by the distance measurement system, and
at least one indicating device, to which said correcting variable of said distance measurement system is applied and which supplies an indication depending on said correcting variable,
wherein
said indicating device comprises at least one tactile indicator, which is displaced continuously or quasi continuously along a tactile path as a monotone function of the distance measured by said distance measurement system; and wherein said indicating device comprises a plurality of indication ranges and further comprising indication range switching means adapted to switch said indicating device from one of said indication ranges to another of said indication ranges.

14. The device of claim 13, wherein said indication range switching means comprise one or more actuating elements.

15. The device of claim 14, further comprising a housing adapted to accommodate said actuating element or elements, respectively, of said indication range switching means.

16. The device of claim 15, wherein said actuating element or elements, respectively, are adapted to be actuated by one or several fingers of the user.

17. The device of claim 16, wherein said housing has one or several recesses and said actuating element or elements, respectively, are provided said one or several recesses of said housing.

18. A device to aid the orientation of blind and partially sighted people, comprising
at least one contactless distance measurement system, which generates a correcting variable depending on the distance between the device and an object measured by the distance measurement system,
at least one indicating device, to which said correcting variable of said distance measurement system is applied and which supplies as indication depending on said correcting variable,
wherein
said indicating device comprises at least one tactile indicator, which is displaced continuously or quasi continuously along a tactile path as a monotone function of the distance measured by said distance measurement system; and
a housing adapted to accommodate said tactile indicator and adapted to be put on one part of the users body.

19. The device of claim 18, wherein said housing is adapted to be put on and fastened to the forearm of the user.

20. The device of claim 18, wherein said housing is designed as a hand held device.

21. The device of claim 20, wherein said housing defines an outside and said tactile path is located on said outside of said housing and is perceptible by a finger of the user.

22. The device of claim 21, further comprising a recess in said housing, in which said tactile path extends.

23. A device to aid the orientation of blind and partially sighted people, comprising
at least one contactless distance measurement system, which generates a correcting variable depending on the distance between the device and an object measured by the distance measurement system,
at least one indicating device, to which said correcting variable of said distance measurement system is applied and which supplies an indication depending on said correcting variable,
wherein
said indicating device comprises at least one tactile indicator, which is displaced continuously or quasi continuously along a tactile path as a monotone function of the distance measured by said distance measurement system; and
a housing entirely accommodating said device.

24. A device to aid the orientation of blind and partially sighted people, comprising
at least one contactless distance measurement system, which generates a correcting variable depending on the distance between the device and an object measured by the distance measurement system,
at least one indicating device, to which said correcting variable of said distance measurement system is applied and which supplies an indication depending on said correcting variable,
wherein
said indicating device comprises at least one tactile indicator, which is displaced continuously or quasi continuously along a tactile path as a monotone function of the distance measured by said distance measurement system; and
two or more contactless distance measurement systems each generating a correcting variable depending on said distance between said device and said object detected by each of said distance measuring systems.

25. The device of claim 24, further comprising two or several tactile paths extending side by side and two or several tactile indicators, which are displaceable along said tactile paths.

26. A device to aid the orientation of blind and partially sighted people, comprising
at least one contactless distance measurement system, which generates a correcting variable depending on the distance between the device and an object measured by the distance measurement system, and at least one indicating device, to which said correcting variable of said distance measurement system is applied and which supplies an indication depending on said correcting variable, wherein said indicating device comprises at least one tactile indicator, which is displaced continuously or quasi continuously along a tactile path as a monotone function of the distance measured by said distance measurement system, and wherein said device is powered by a battery generating a battery voltage and means are provided to generate a warning signal when said battery voltage breaks down.

27. A device to aid the orientation of blind and partially sighted people, comprising at least one contactless distance measurement system, which generates a correcting variable depending on the distance between the device and an object measured by the distance measurement system, at least one indicating device, to which said correcting variable of said distance measurement system is applied and which supplies an indication depending on said correcting variable, wherein said indicating device comprises at least one tactile indicator, which is displaced continuously or quasi continuously along a tactile path as monotone function of the distance measured by said distance measurement system; and a telescopically extendable cane.

* * * * *